United States Patent [19]

Garland

[11] Patent Number: 5,182,766
[45] Date of Patent: Jan. 26, 1993

[54] GENERALIZED TELECOMMUNICATIONS CUSTOMER SIGNALING ARRANGEMENT

[75] Inventor: Stuart M. Garland, Morton Grove, Ill.

[73] Assignee: AT&T Bell Laboratories, Murray Hill, N.J.

[21] Appl. No.: 629,891

[22] Filed: Dec. 19, 1990

[51] Int. Cl.⁵ .................. H04M 3/42; H04M 1/00
[52] U.S. Cl. ..................... 379/216; 379/201; 379/212; 379/355
[58] Field of Search ............... 379/355, 216, 201, 212

[56] References Cited

U.S. PATENT DOCUMENTS

| | | | |
|---|---|---|---|
| 4,513,175 | 4/1985 | Smith | 379/355 |
| 4,571,463 | 2/1986 | Shefler | 379/355 |
| 4,613,730 | 9/1986 | Fechalos et al. | 379/355 |
| 4,769,835 | 9/1988 | Hirth et al. | 379/216 |

FOREIGN PATENT DOCUMENTS 0053368  2/1990  Japan ................... 379/216

OTHER PUBLICATIONS

Bell Communications Research Technical Reference TR-TSY-000505, Issue 2, Call Processing, LATA Switching Systems Generic Requirements, Section 5, Jul. 1987, pp. 5.3-5-5.3-17.

Primary Examiner—James L. Dwyer
Assistant Examiner—Harry S. Hong
Attorney, Agent, or Firm—Werner Ulrich

[57] ABSTRACT

This invention relates to a method and apparatus for signaling telecommunications customer requests to a switching system. The basic signaling arrangement consists of a series of function calls, including a function type specifier and an optional parameter of the function. Function calls are separated by delimiters which are strings of characters, such as ** or *#, that are unique and not to be confused with function type specifiers or parameters. Strings of function calls can be stored in a switching system and can be called by a speed calling request. The function types include types wherein a customer supplies a parameter, such as a personal identification code in an otherwise prespecified string of function calls.

36 Claims, 4 Drawing Sheets

GENERALIZED TELECOMMUNICATIONS CUSTOMER SIGNALING ARRANGEMENT

TECHNICAL FIELD

This invention relates to a method and apparatus for telecommunications customer signaling.

PROBLEM

Over the course of the last several decades, the amount of information that customers dial or key from their telephones has been increasing. First, as customers dialed direct distance dialing calls, many of their calls required dialing 10 instead of 7 digits. Later, a requirement for an initial 1 or 0 for long distance calls made this 11 digits. Later, customer dialing of calling card calls caused customers to dial an extra 14 digits for the calling card. Subsequently, the provision of specialized services by vendors or providers of service, such as banks, required customers to dial additional information to access, for example, information about their account.

Along with this increase in the amount of dialing required of telephone customers, services were provided to reduce the amount of dialing. Two such types of services are now available, those using customer premises equipment (CPE) and those using facilities of a telephone switching system. The former include repertory dialers in which the customer can preset a series of numbers; when the customer presses an appropriate button, these numbers are automatically transmitted to the connected telephone switching system. Speed dialing is a switching system-based service wherein the customer specifies one, two, or three digits and, on the basis of these digits, the telephone switching system consults translation records, stored in memory of the system, to find the number previously provided by the customer that is represented by the speed dial code. For speed calling lists, the number specified in the speed calling list only includes a destination telephone number plus any access code, such as the 9 usually prefixed on outgoing calls from a Private Branch Exchange (PBX) or Centrex telephone.

The CPE devices permit a customer to specify a string of digits (such as the digits for a destination telephone number) to be initially pulsed out, then to be followed by a pause prespecified by the customer, then to be followed by an additional string of digits. This, for example, can be used effectively for making calling card calls from the customer's home. A problem is that a short prespecified pause may lead to premature outpulsing and a call requiring a new origination, while a long prespecified pause causes the customer to become impatient, and defeats part of the purpose of repertory dialing. The problem is even worse when vendor equipment is accessed. When the Customer Premises Equipment pulses out strings of digits with prefixed delay, the equipment cannot take into account variations in the call set-up time. These variations may be very substantial, especially in the case of long distance calls. Thus, if the CPE is preprogrammed, it will either frequently improperly access the vendor equipment, or an unnecessarily long delay will be inserted before the vendor equipment is accessed. Further, repertory dialers are not at this time available on the most advanced types of phones available today; namely, the phones having data ports and used in connection with Integrated Services Digital Network (ISDN) services manufactured by AT&T Network Systems.

Switch-based speed dialing is, in many ways, even more limited than repertory dialing. The speed dialing services currently available only provide customers the capability of specifying a destination telephone number. Any additional information must be keyed by the customer.

Accordingly, there is, at present, no satisfactory arrangement for minimizing customer dialing for services requiring substantially more dialing than the specification of a destination telephone number. More generally, a problem of the prior art is the highly limited arrangements for permitting customers to specify actions beyond the actions of simple telephone connections and the out-pulsing of digits to the serving switching system.

SOLUTION

The above problems are solved and an advance is made over the prior art in accordance with the principles of this invention, wherein a modified dialing plan and apparatus for accepting the modified plan is provided, which permits customers to dial a string of function calls, each function call for performing a separate action. In one specific embodiment of the invention, customers dial, for each function call, a function specifier, an optional parameter of the function, and a function delimiter. To specify the end of dialing, a final delimiter, different from the function delimiter, is dialed. Such a series of functions can either be dialed directly by the customer, or can be specified in a speed dialing list, or the two can be combined by having a speed dialing list which requests, at appropriate times, specific parameter inputs from the customer. Advantageously, such an arrangement offers an open-ended dialing plan for specifying an arbitrary number of ones of an arbitrary number of functions. A switching system stores, for a speed calling customer, a string of prespecified functions and data associated with each function, the functions to be executed in response to a speed calling request from a customer. In an illustrative embodiment, these functions include a delay of a prespecified time, detection of a prespecified type of tone, return of control to a caller so that special numbers, such as a personal identification number, may be keyed by the customer at the critical time, and a request for an additional speed call request from the customer to obtain, for example, a prestored directory number. Advantageously, such arrangements can be used, even from a telephone which is not equipped with the repertory dialer, to set up conference calls, all or some of whose numbers are stored in the speed calling list of the customer, to set up calls to vendor equipment and to perform much of the communications with this vendor equipment, to automatically dial calling card calls, including the calling card number, to cause a switch to automatically perform a test on a line, or to forward a call to a destination specified by a directory number, the number being specified by the speed calling entry or by a full directory number, keyed by the customer. For other function calls, the customer is prompted to dial the function variable. More generally, any functions which can be performed by the switching system, and which the telephone administration which is prepared to offer to its end-user customers, can be invoked thereby.

An initial function call is triggered by a delimiter, an initial function invocation string  (a string which is not used for any other purpose), followed by a fixed length, i.e., two-digit function specifier, followed by an arbitrary-length function variable. The delimiter between function calls in this specific embodiment is the same as the initial function invocation string call delimiter . Following the last function call, a final terminating string delimiter *# (a string which is not used for any other purpose) is used to signal to the switching system that no more information is being provided. Any function which the switch is capable of performing, for which the telephone administration finds it desirable to permit its customers to request, can be specified through the use of this string. Advantageously, this entire arrangement can be implemented without destroying any aspect of the present numbering plan.

In the dialing plan, an escape code is provided such that additional function codes may be offered. In one specific embodiment, if the last digit of the function code is 9, another pair of function code digits are accepted.

Speed calling lists are used to store strings of function invocations. Additionally, if the customer dials an initial invocation string ** signal, the customer may specify a complete function string, without having the function string prespecified in the speed calling list. The latter option is attractive for customers having personal computers for controlling their telephone signaling.

Another function which can be implemented using this modified number plan is the function of permitting customers to place a service order for requested telephone features to the telephone company business office without forcing the customers to visit the office or to talk over the phone to a service representative. Use of a personal identification number (PIN), for example, is one way of protecting the calling telephone customer from malicious interference by another individual when this service is provided. The PIN can be the number of the customer's credit card, and the customer identification can be a combination of the automatic number identification of the customer's line and/or the customer's calling card number.

Accordingly, this invention provides a dialing plan, comprising function calls and delimiters, for specifying an arbitrary length series of functions and any required numbers for each function, to be performed by the switch; the function call string can be stored in a switching system in one or more speed calling list entries, and is executed by the system as a series of customer requests, one request for each function call.

DETAILED DESCRIPTION

Figure 1:
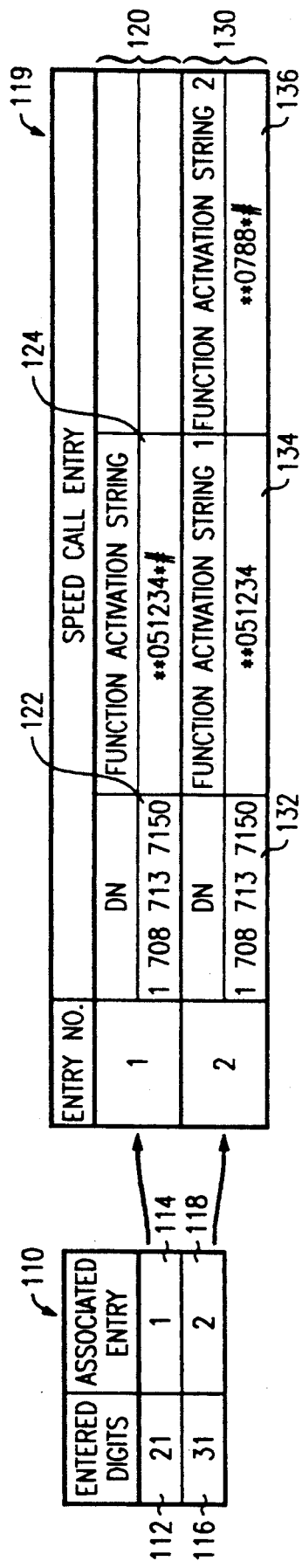
FIG. 1 is a memory layout of a speed calling list.

FIG. 1 is a diagram of the memory layout for implementing the invention and, further, an illustration of the characteristics of the numbering plan. For the specific example, two numbers of a customer's speed calling list are illustrated. In this particular case, one or two speed calling digits, specifying the particular member of a customer's speed calling list that is being specified, are followed by a special code to identify the previous digit(s) as speed calling digits. In present systems, this special code is #. If the speed calling digits are 21 (table entry 112), then pointer 114 points to entry one of the speed calling list. Similarly, if the speed calling digits are 31 (entry 116), then pointer 118 points to the speed calling entry two. Speed calling entries are shown in Table 119 and include speed calling entry 120, pointed to by pointer 114, and speed calling entry 130, pointed to by pointer 118. The speed calling entry corresponding to speed calling digits 21 consists of the directory number 1-708-713-7150 and the function string ** (function activation), 05, a function code for a pause of 5 seconds, to be followed by outpulsing the digits of the function variable, followed by 1234, the digits to be outpulsed. The function string is terminated with the final delimiter *#, indicating that no more functions are associated with this speed call entry. The eight functions 01-08 are used for a pause of from one to eight seconds, following which the function variable is outpulsed.

The speed call entry associated with pointer 118, which is triggered by customers dialing the speed call number 31 consists of the same initial directory number in field 132. The same initial function string, in this case, is not followed by a final delimiter, but by an additional function string, 136, consisting of the initial delimiter **, function 07, indicating that a seven-second pause is to be made prior to outpulsing the function variable, 88, after which no more functions are to be performed, as indicated by the final delimiter *#.

Many other function calls can be implemented using this arrangement. One set of functions can be used for transmitting digits to a connected terminal, such as a bank; the digits can be transmitted as tones (DTMF or MF) or as data digits for an ISDN line. The connection can be to Customer Premises Equipment (CPE) to control or monitor CPE equipment, such as remotely controlled switches or answering equipment. Another function is to fetch a number from a speed calling list of the caller. Another function is to wait for a signal, such as an answer signal from a connected terminal or station. Another function is to forward a call to a predefined, or to a customer-supplied, number. All of these functions can be invoked by a dialing analysis program which can invoke any of the functions available in the existing programs, or programs that may in the future be added, that control the telecommunications switch.

Figure 2:
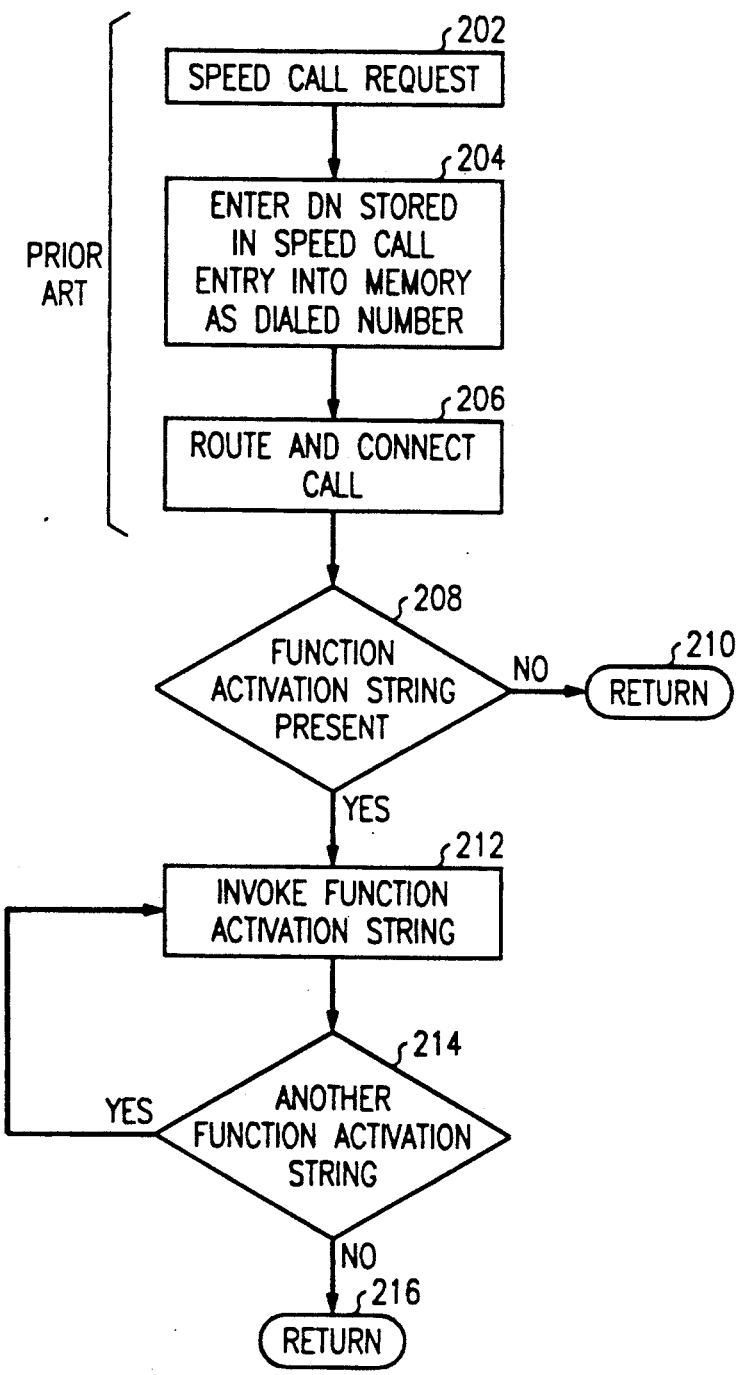
FIGS. 2-4 are flow diagrams of a program for executing the method of this invention.

FIG. 2 is a flowchart for implementing the execution of such speed calling lists in a switch. Boxes 202, 204, and 206 are from the prior art and represent, respectively, the recognition of an initial speed calling request, the entry of the corresponding directory number stored in memory, into a call processing register of the system as a dialed number, and the routing and connection of the call to that dialed number. Following the performance of this action, the additional functions for implementing this invention are performed. Test 208 determines whether a function string is present. This test is performed by checking to see if there are more functions in the speed calling entry, specifically the characters  indicating the presence of a function call. If there is no function call in the speed call entry, then the system returns to other call processing (action block 210) because no further actions are required with respect to setting up information in a call register for processing this call. If a function activation string is present, then that function activation string is invoked by examining the function code and using the function code to operate on the function variable, if any. For example, in the case of the speed calling entries of FIG. 1, the function code indicates the pause and the subsequent outpulsing of the digits of the function variable. Following the execution of this function, another test, test 214, is performed to see if there is an additional function activation string. This test is performed by checking whether the digits following the function variable are  (implying another function string) or *#, (implying the end of the string of function activations). In the latter case, the system transfers to return (action block 216) because no further functions are required. Otherwise, action block 212 is reentered.

Figure 3:
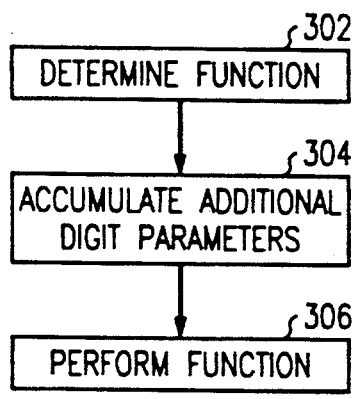

FIG. 3 is an expansion of block 212. First, the function is identified by examining the function code digits (action block 302). In this particular implementation, these digits are two digits, unless the last digit is a nine, in which case two more digits are examined. Therefore, if the last digit of these two additional digits is a nine, then further digits are examined. This arrangement allows an indefinitely large range of function codes. Action block 304 indicates that a function variable for carrying out the function is accumulated. This can be done in one of two ways. Either the digits are stored as variables of the function call in the function call string, or the code specifies a return to the customer so that the customer can dial additional information, and these additional dialed digits are accumulated. Finally, action block 306 is performed, which performs the function on the basis of the specified code and the variable, if any, of the function called.

Figure 4:
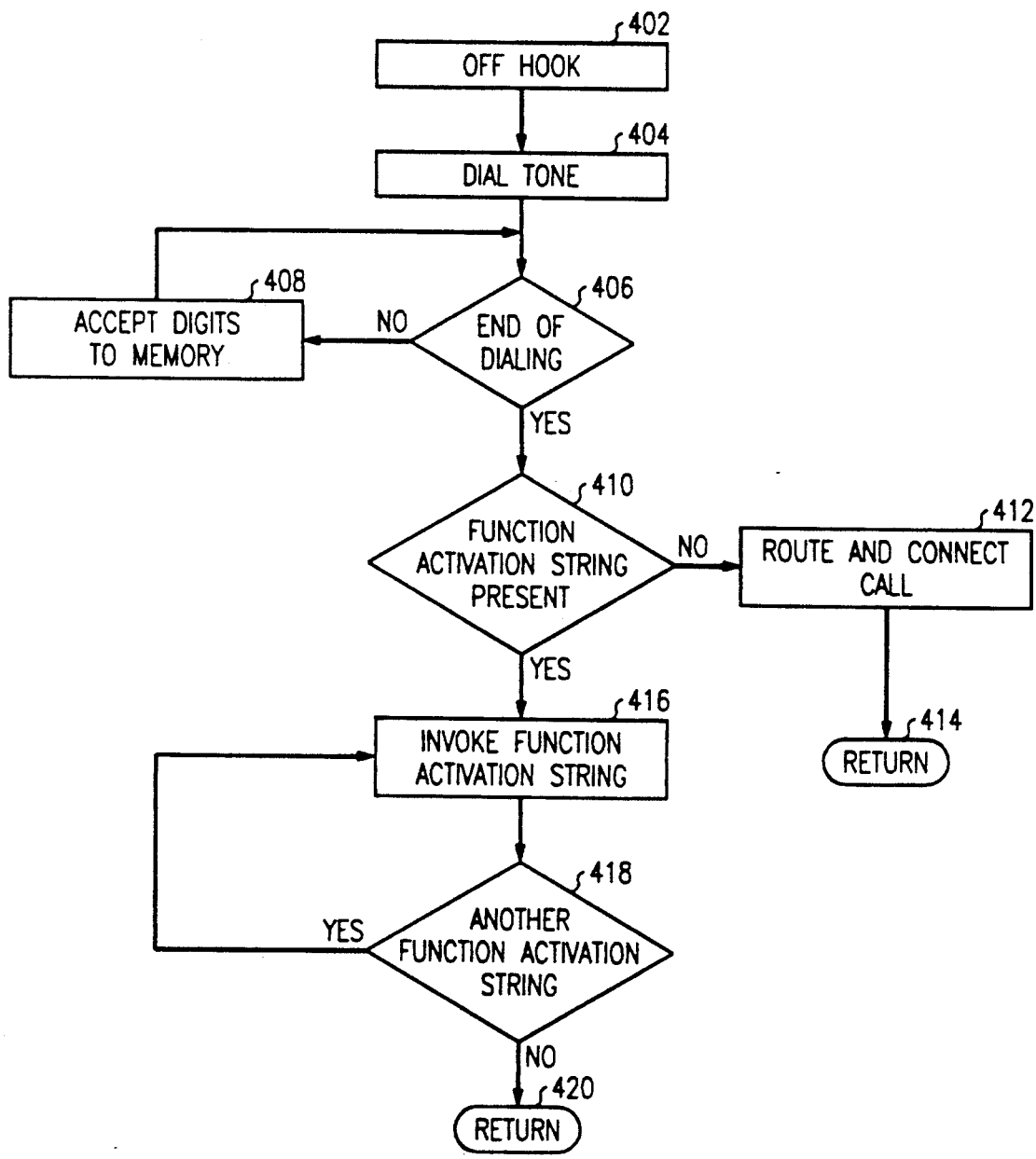

FIG. 4 is a flow diagram of actions performed by a switching system in accepting a call which is not speed dialed. The customer's going offhook is detected in the switching system (action block 402). Dial tone is returned (action block 404). Thereafter, a loop consisting of test 406 and action block 408 is performed to accept digits and store these digits in memory (action block 408) until the end of dialing is detected (test 406). In order to permit the expanded dialing plan of the present invention to coexist with the present dialing plan, a customer who plans to request additional functions dials the destination number as a function request by dialing , function code 10 (indicating a dialed destination request), followed by the destination number, followed by  to signal the next function request. Thus, the end of dialing test must be modified so that if the ** signal precedes the dialed string, the end of dialing is detected in test 406 by the recognition of *#. After test 406 has been performed and the end of dialing has been detected, test 410 is used to determine whether a function activation string (i.e., ) was present as part of the dialing of the destination number. If not, then the call is routed and connected (action block 412) and the system returns to processing other calls (action block 414). If a function activation string is present, as detected in test 410, then action block 416, generally similar to action block 212, is performed to invoke the function activation string. The main difference between action blocks 416 and 212 is that in action block 416, the function call has been accumulated in the dialing register, whereas in action block 212, the function string is found in the speed calling list. Finally, test 418 is used to determine if another function activation string has been dialed by the customer. If an initial  was detected, then the end of dialing is not detected by test 418 until the terminal signal *# has been detected. If not, the system processes other calls (action block 420). Otherwise, the next function activation string is invoked by action block 416.

A caller can dial a function string to create a speed calling list entry. For a speed calling entry, it is convenient to have a function which requests caller input at a specific point in the function string execution, so that a caller may provide, for example, a personal identification number (PIN) in an otherwise prespecified sequence of digits. When a caller creates a speed calling list entry, the dialed digits are simply entered sequentially in one block of the list and then, in response to a speed calling request, executed as described with respect to FIG. 2. The caller can create a speed calling list entry from a terminal as well as from a station if the terminal is equipped with a DTMF transmitter or connected to a data channel such as an ISDN D-channel.

The dialing plan arrangement can be used for any prespecified function which the switching system is prepared to handle. For example, if the switching system is prepared to process sequential calls, then the numbers for these calls can be stored in a speed dialing entry and calls can be made sequentially to all numbers on the list. If each call requires additional functions, these functions can also be stored. If a pattern of functions exist for a particular predefined call, the pattern can be prespecified by the caller as a speed calling entry, and the caller can then be prompted to provide the called number for each invocation of the speed call, or can be prompted repeatedly to enter a next number for a repetition of the call to a new number.

As another example, the dialing plan can be used to permit a utility to access Customer Premises Equipment (CPE) such as meters, or other CPE equipment, or switches for removing power from air conditioners or controlling other devices. Signals to CPE can be sent from a switching system directly connected to a utility controller or connected via one or more switching systems. The switching system connected to the CPE receives a string consistent with the dialing plan; such a string can be the parameter of one of the function types specified to the switching system connected to the controller or can be sent directly by the controller. In response to this string, the latter switching system can send commands to the CPE specifying a particular meter or power controller (parameter) and a function to be performed (function type). The latter switching system can also receive and execute a function type for receiving response messages from the CPE and storing the results or forwarding them to the utility controller.

The CPE can also be programmed to receive function strings of the same general type described herein for use by a switching system. Other customer telecommunications equipment such as private branch exchanges (PBXs) can also be programmed to receive or transmit such function strings.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. In a telecommunications switch, a method of interpreting a substring of characters to said telecommunications switch comprising the steps of:
   a. interpreting initial characters of a substring as a function type;
   b. interpreting subsequent characters of the substring as one or more function parameters for function types of a class requiring parameters; and c. interpreting a predefined delimiter character substring as the end of a function call;

whereby a substring of characters is interpreted as a function call.

2. The method of claim 1 wherein said characters are selected from the set of characters represented on a push-button telephone station.

3. The method of claim 1 wherein step b comprises interpreting said subsequent characters as an index for selecting said function parameters from storage of said switch.

4. The method of claim 1 wherein a function type of step a comprises the function of transmitting a series of digits representing a function parameter specified in step b.

5. The method of claim 4 further comprising:
said switch establishing a connection;
wherein said transmitting comprises transmitting digits over said connection.

6. The method of claim 1 wherein step a interprets waiting for a predetermined interval of time.

7. The method of claim 1 wherein step a interprets waiting for a period of time specified by a parameter of step b.

8. The method of claim 1 wherein step a interprets waiting for a specified event.

9. The method of claim 1 wherein step a interprets waiting for an event specified by a parameter of step b.

10. The method of claim 1 wherein a function type of step a is a function type for transferring a call.

11. The method of claim 1 wherein step a interprets a function type specified by a fixed number of characters not representing an escape value, or a fixed number of characters representing an escape value followed by at least one additional character.

12. The method of claim 1 further comprising:
prior to step a, interpreting a character substring as a delimiter.

13. The method of claim 1 further comprising:
storing said function type and said one or more function parameters in a speed calling list for execution in response to a speed calling request.

14. The method of claim 13 further comprising:
storing said delimiter in said speed calling list.

15. The method of claim 1 further comprising:
interpreting at least one additional function call by repeating steps a, b, and c at least once.

16. The method of claim 15 wherein a first of said function types is connection to a terminating directory number interpreted as a parameter and a second of said function types is a transmission of a plurality of digits as a series of signals, the plurality of digits being interpreted as a parameter of said second function type.

17. The method of claim 12 wherein a third of said function types is a wait for a period of time function.

18. The method of claim 12 wherein a third of said function types is a wait for a prespecified event.

19. The method of claim 14 wherein said prespecified event is an answer signal from a station of said terminating directory number.

20. The method of claim 11 further comprising storing said requested function and said at least one additional function in a speed calling list, whereby a customer can request execution of a series of functions by dialing a speed calling number.

21. The method of claim 15 wherein said at least one additional function comprises a last additional function, and wherein a terminal delimiter is interpreted in step c of an interpretation of said last additional function, and an intermediate delimiter is interpreted in step c of an interpretation of other functions.

22. The method of claim 11 wherein said at least one additional function comprises a function for requesting a caller supplied parameter, whereby a speed calling entry may comprise a series of function calls including at least one whose parameter is supplied by a caller.

23. The method of claim 15 wherein one of said functions interpreted in step a of an interpretation of said one function is a function for entering a service order.

24. The method of claim 15 wherein said function type and said at least one additional function type of steps a and said parameters of steps b are interpreted as a request to establish a plurality of call connections.

25. The method of claim 15 wherein said function call and said at least one additional function call are interpreted as function calls for sending signals to at least one customer premises equipment to control electrical load from said at least one customer premises equipment.

26. The method of claim 25 wherein said function call and said at least one additional function call are stored in a speed dialing list.

27. The method of claim 15 wherein said function call and said at least one additional function call are interpreted as function calls for sending signals to at least one customer premises equipment to access equipment from said at least one customer premises equipment.

28. The method of claim 27 wherein said function call and said at least one additional function call are stored in said switch.

29. The method of claim 15 wherein said at least one additional function call comprises a function call of waiting for a predefined signal.

30. The method of claim 25 wherein said predefined signal is an answer signal.

31. The method of claim 25 wherein said predefined signal is a tone signal.

32. The method of claim 25 wherein said predefined signal is a predefined set of digits.

33. The method of claim 15 wherein said at least one additional function call comprises a function call for fetching a number from a speed calling list.

34. In a telecommunication switching system, apparatus for processing customer signals comprising:
means responsive to customer signals for interpreting a first set of said signals as a function type, a second set of said signals as a function parameter for function types requiring parameters, and a third set of said signals as a delimiter.

35. The apparatus of claim 34 further comprising:
storage means for storing said function type and function parameter in a speed calling list.

36. The apparatus of claim 35 further comprising:
means responsive to a speed calling request for executing a function stored in said speed calling list.

* * * * *

UNITED STATES PATENT AND TRADEMARK OFFICE
CERTIFICATE OF CORRECTION

PATENT NO. : 5,182,766
DATED : January 26, 1993
INVENTOR(S) : Stuart M. Garland

It is certified that error appears in the above-identified patent and that said Letters Patent is hereby corrected as shown below:

Column 7, claim 17, line 54, delete "12" and substitute --16--.
Column 7, claim 18, line 56, delete "12" and substitute --16--.
Column 7, claim 19, line 58, delete "14" and substitute --18--.
Column 7, claim 20, line 61, delete "11" and substitute --15--.
Column 8, claim 22, line 9, delete "11" and substitute --15--.
Column 8, claim 30, line 41, delete "25" and substitute --29--.
Column 8, claim 31, line 43, delete "25" and substitute --29--.
Column 8, claim 32, line 45, delete "25" and substitute --29--.

Signed and Sealed this

Seventh Day of December, 1993

Attest:

BRUCE LEHMAN

*Attesting Officer*                *Commissioner of Patents and Trademarks*